United States Patent [19]

Paskarbeit et al.

[11] 4,402,083
[45] Aug. 30, 1983

[54] ELECTRIC SMELTING FURNACE AND ASSOCIATED CHARGING EQUIPMENT AND BINS

[75] Inventors: Edgar Paskarbeit, Oberhausen; Horst D. Schöler, Duisburg, both of Fed. Rep. of Germany

[73] Assignee: M.A.N. Maschinenfabrik Augsburg-Nürnberg Aktiengesellschaft, Fed. Rep. of Germany

[21] Appl. No.: 349,760

[22] Filed: Feb. 18, 1982

[30] Foreign Application Priority Data

Feb. 24, 1981 [DE] Fed. Rep. of Germany ....... 3107016

[51] Int. Cl.³ .............................................. F27D 3/12
[52] U.S. Cl. ......................................... 373/79; 373/9; 373/81; 266/142; 414/173
[58] Field of Search ................. 373/8, 9, 77, 79, 81, 373/82; 266/142, 143, 158; 414/160, 172, 173, 208

[56] References Cited

U.S. PATENT DOCUMENTS 3,385,584  5/1968  Kemmetmueller ............... 266/142
3,634,592  1/1972  Pantke et al. ..................... 373/81
3,746,325  7/1973  Freeberg et al. ............. 266/158 X
3,913,898 10/1975  Wolters ............................. 373/9
3,936,588  2/1976  Asphaug et al. .................. 373/81
3,938,788  2/1976  Josten ............................. 266/142
4,160,117  7/1979  Schempp .......................... 373/9

Primary Examiner—Roy N. Envall, Jr.
Attorney, Agent, or Firm—McGlew and Tuttle

[57] ABSTRACT

To save space in furnace installations and obtain an optimum continuous charging, an arrangement is disclosed in which electric smelting furnaces are arranged in a furnace bay unilaterally, close to the adjacent ladle bay and the associated charging equipment and bins are provided sequentially in a vertical zone between the crane runways of the two bays. Bins are filled with iron material, such as iron sponge, alloying mechanisms, and fluxing substances by a conveyor traveling thereabove. The contents of bins are delivered through conveying and metering devices which are provided between crane runways to a reversible conveyor extending at a lower level and equipped with discharge mechanisms and fed through a charging tube 1 into electric furnace. A traveling metering device is provided for adding alloying into the furnace, and fluxing material for subsequent treatment in the ladle, through charging tube. A housing encloses the furnace on all sides, to prevent emissions. The furnace bay may be completely separated from the adjacent ladle bay by a protective wall and by shutoff partitions which are provided at both sides of the bins.

5 Claims, 3 Drawing Figures

ELECTRIC SMELTING FURNACE AND ASSOCIATED CHARGING EQUIPMENT AND BINS

FIELD AND BACKGROUND OF THE INVENTION

The invention relates to an arrangement of an electric smelting furnace with bins and charging equipment being disposed above the furnace and the charging equipment being employed for transporting the charge over conveyors into these bins, removing it from these bins through conveying and metering devices, and feeding it by means of charging tubes into the furnace vessel.

In a prior art electric smelting furnace arrangement of this kind, intended for charging material such as iron sponge, the iron material is transported from storage yards into the supply bin above the furnace and passes therefrom to the charging holes of the furnace (see West German Offenlegunsschrift No. 19 53 378). The supply bin and the associated conveyor are supported on an extensible, retractable, and pivotable frame so that further space is required. In addition, alloying and fluxing mens can be added into the furnace and, for secondary metallurgical treatment, into the ladle, only in the hitherto usual manner, namely while using transportation vehicles, so that weighed amounts of needed alloying or fluxing means are introduced through a hole into the furnace, or added to the tapped melt in the ladle. The alloying and fluxing means are usually stored in the furnace bay, and the transportation from this storage area to the furnace or the ladle is expensive.

SUMMARY OF THE INVENTION

The invention is directed to an arrangement of an electric smelting furnace and the associated bins and charging equipment in a manner such that with the required space minimized, an optimum continuous fed of the charge material into the furnace and the melt during and after the tapping is obtained, and disturbing emissions into the furnace bay and the adjacent ladle bay are minimized.

In accordance with the invention the electric melting furnace is provided in the furnace bay, at the side close to the ladle by adjacent to the furnace bay with the bins for the iron stock, fluxing material, and alloying means, and with their associated outlet, conveying, and metering devices are provided sequentially in the longitudinal direction of the bay, in the vertical zone between the crane runways of the furnace bay and of the adjacent ladle bay, that a reversible conveyor extending transversely to the longitudinal direction of the bays is provided at a lower level and equipped with discharge mechanisms at both its ends, followed by charging tubes, and that anti-emission means are provided.

The vertical zone in the longitudinal direction of the hall, between the crane runways of the furnace bay and of the adjacent ladle bay, is particularly suitable for accommodating the bins and the charging equipment, since this is the area of greatest height in the hall, and the space hardly ever utilized. Since the bins for the material to be charged, for example, sponge iron, and for fluxing and alloying means, are arranged successively, one after the other, they make it possible to supply the material by means of conveyors traveling to serve all of the bins and taking up the material from storage areas outside the hall. The material to be charged is directed from the bin outlets to conveying and metering devices of a design known per se, which are provided directly between the crane girders of the furnace and ladle bays. The space for accommodating the outlet, conveying, and metering devices is thus bounded on both longitudinal sides by the crane girders and convered both above and below. Dust and noise produced by the transfer cannot penetrate into the neighboring bay. The alloying means and fluxing substances pass from the respective bins to a metering device traveling parallel to the conveying device and equipped for exactly weighing small amounts. The material is fed to a reversible conveyor extending transversely to the furnace bay at a lower level. At the furnace side, the material is directed by a discharge mechanism of the reversible conveyor into one or more following charging tubes, and fed into the furnace. One or more other bins, also sequentially arranged overhead, are provided for materials needed for secondary metallurgical treatment in the ladle. These materials are supplied through the traveling metering device to the reversible conveyor whose run is now reversed so that the fluxing means pass to the discharge mechanism at the conveyor end close to the ladle bay. Through the charging tube connected to this conveyor end, the material can be added to the melt during the tapping operation or, with the ladle car somewhat withdrawn, during the post-treatment. To prevent dust diffusion, the reversible conveyor and the discharge mechanisms are enclosed at all sides. The electric furnace is also enclosed all around by a housing, with only the side wall facing the furnace bay being shiftable, to minimize the disturbing fumes, noise, and heat emanating from the furnace. Holes are left in the housing for passing therethrough the charging tubes. The fumes are taken out from the housing by suction, in a manner known per se. The arrangement of the charging equipment and bins between the furnace and the ladle bay makes it possible to completely separate the furnace bay from the neighboring bays for further treatment, except for necessary openings for means of transportation. Then, the bins disposed above the crane runways supports, and the conveyors traveling at a still higher level, are shut off at both sides up to the roof truss. With an omission of the furnace encasement, the furnace bay may be isolated from the neighboring bay by a protective wall.

The invention has the advantage that due to the central arrangement of the material bins, a single train of conveyors can handle the supply of the material to be charged, as well as all of the necessary additives, and that the material can be fed from the bins both to the electric furnace and to the melt pour into the ladle or received therein for post-treatment through a single system of transportation. No standby space for fluxing and alloying means is needed any longer on the working floor of the furnace bay. No ways of transporation of fluxing and alloying means to the bins, the furnace, and the melt need be provided. This results in a clean saving of the overall walled-in volume. The central arrangement of the equipment for supplying an electric smelting furnace makes it possible to cover the entire production with a single control circuit, controlling and monitoring the succession of necessary operating steps.

Thus, it is an object of the invention to provide, in an electric smelting furnace arrangement of the type having an electric smelting furnace including a furnace vessel, bins, charging equipment means operable for transporting a charge into the bins, conveying means and metering means for removing the charge from the bins, charging tubes for feeding the charge into the furnace vessel, an elongated furnace bay, an elongated ladle bay longitudinally extending adjacent to the furnace bay, and crane runways, one of said crane runways being longitudinally extended over a respective one of each of the furnace bay and ladle bay, the improvement wherein the electric smelting furnace is provided in the furnace bay at a side close to the ladle bay adjacent to the furnace bay, the bins comprising first bins for iron stock and second bins for fluxing material and alloying means, and first outlet means connected to said first bins, second outlet means connected to said second bins, conveyors and metering devices located underneath said first and second means, wherein said first and second bins, said first and second outlet means, said conveyors and said metering devices are sequentially mounted in the longitudinal direction of said furnace and ladle bays in a vertical zone between said crane runways of the furnace bay and the adjacent ladle bay, and a reversible conveyor extending transversely to the longitudinal direction of said furnace and ladle bays at a lower level beneath said bins, said outlet means, said first mentioned conveyors and said metering devices, discharge means at both ends of said reversible conveyor, and charging tubes for receiving discharge from the discharge means.

It is a further object of the invention to provide an improved electric smelting furnace arrangement, which is simple in design, and rugged in construction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION

Figure 1:
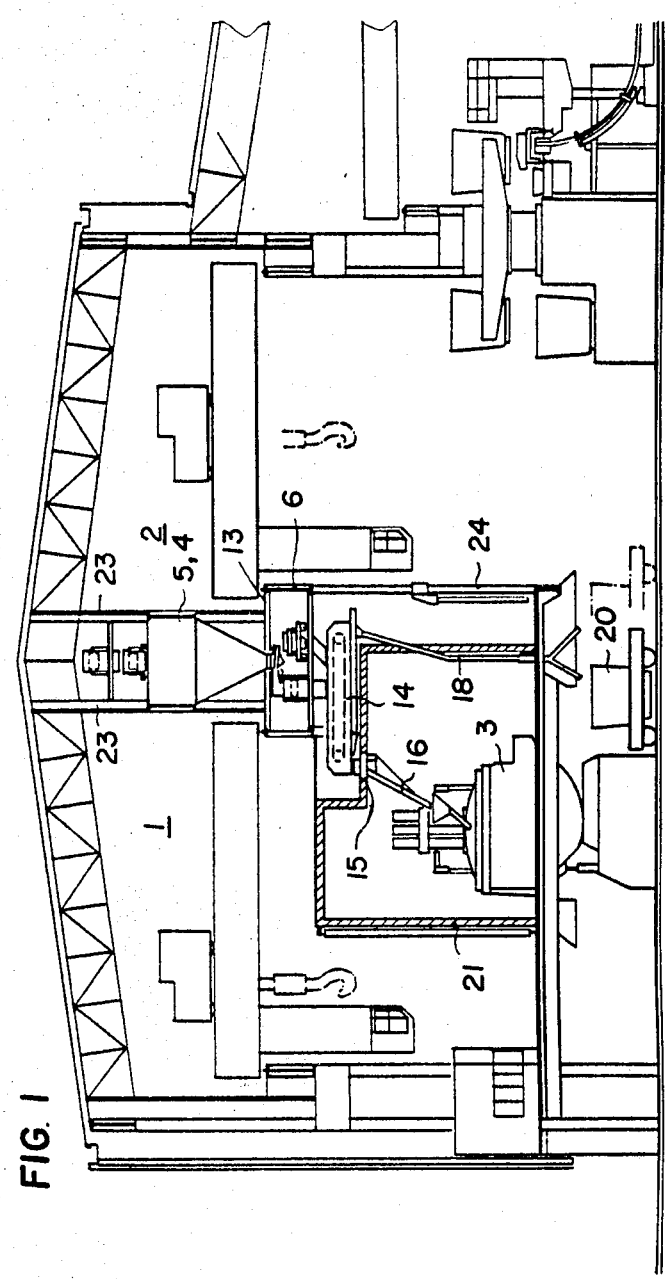
FIG. 1 is a schematic view, partly in section, of the inventive arrangement.
Figure 2:
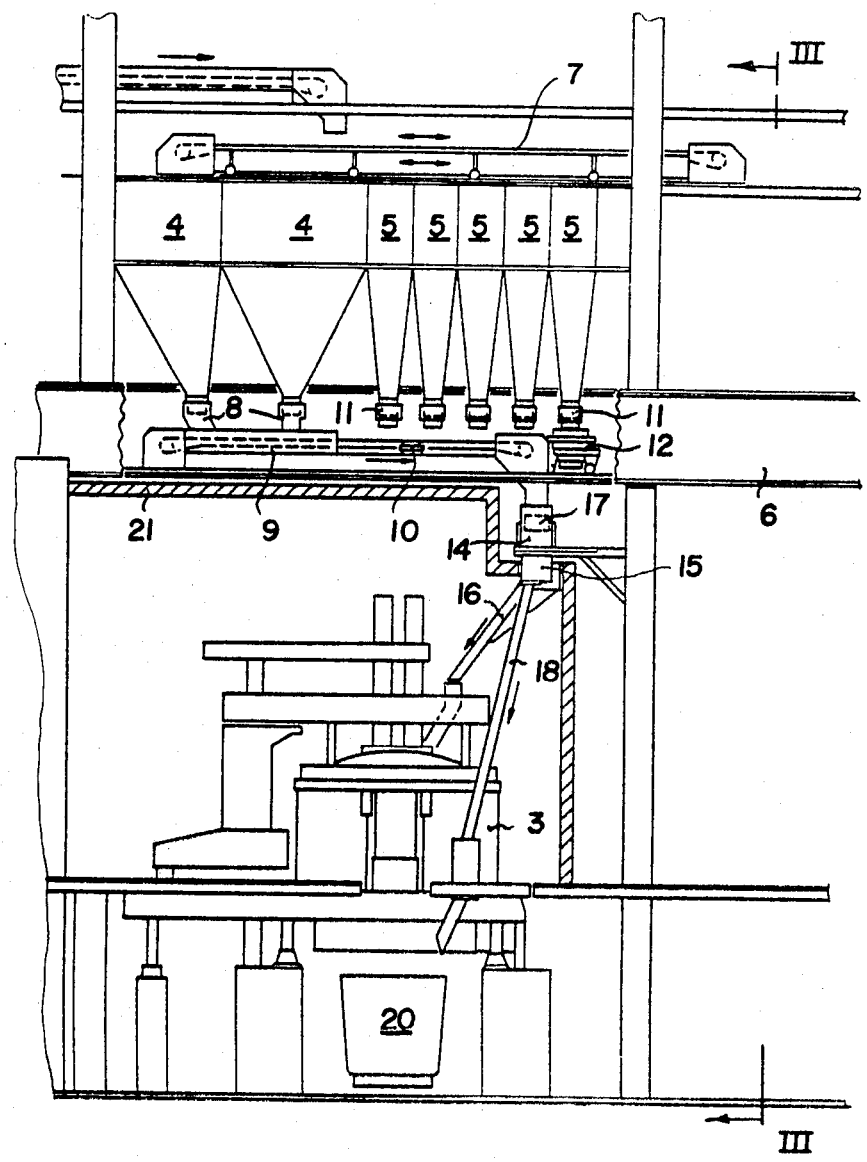
FIG. 2 is a side elevation view, partly in section, as viewed transversely to the direction of the longitudinal bay axis.
Figure 3:
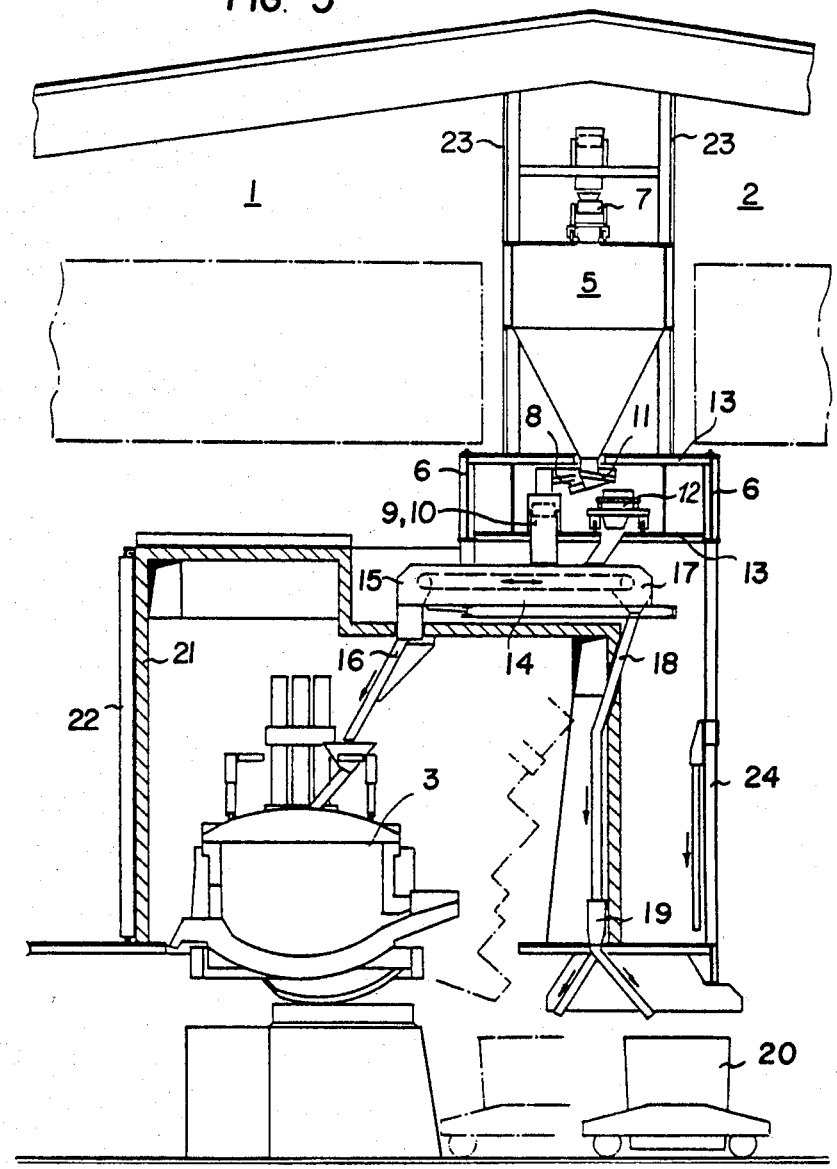
FIG. 3 is a detail view of FIG. 2 taken in the direction of view line III of the longitudinal bay axis.

The figures show a furnace bay 1 and an adjacent ladle bay 2. An electric smelting furnace 3 is set up unilaterally, close to adjacent ladle bay 2, to minimize the paths of transportation for both the charged material and the finished melt. To best utilize the volume of the bays, the supply bins 4 for the iron stock, for example iron sponge, and the supply bins 5 for the fluxing materials and alloying means are arranged, one after the other in the longitudinal direction of the bays, in the vertical zone between the crane girders 6 of the furnace and the ladle bays, above electric furnace 3. Bins 4,5 are filled by means of conveyors 7 which extend thereabove and are supplied from storage areas provided outside the hall. From bins 4, the iron material is fed through an outlet mechanism 8 to a conveying means 9 equipped with a metering device 10. The alloying means and fluxing substances are directed from bins 5 through an outlet mechanism 11 to traveling metering devices 12 which are equipped for exact weighing. The conveying and metering devices 9,10,12 which extend parallel to each other in the longitudinal direction of the hall, are disposed directly between crane girders 6. An upper and a lower cover 13 of the transfer and transportation space prevents pentration of dust and noise. A reversible conveyor 14 extending transversely into furnace bay 1 at a lower level takes up the charge and directs it, through a discharge mechanism 15 at the furnace side and a charging tube 16 connected thereto, into furnace 3.

In order to treat the melt during the tapping operation or subsequently in the ladle, fluxing substances are removed from one or more bins 5, weighed in metering device 12, and supplied to reversible conveyor 14 by which they are fed in the opposite direction, through a discharge mechanism 17 at the ladle bay side, to charging tube 18. There, by means of a deflector 19, the fluxing substances are added to the melt either during the tapping or, for post-treatment, in ladle 20. Electric smelting furnace 3 is enclosed on all sides by a housing 21 having a displaceable side wall 22 facing furnace bay 1. Emissions from the furnace, such as dust, heat, and noise, are largely prevented by this enclosure. Fumes are taken out through suction channels provided inside the housing, which requires substantially less ventilating power than a similar equipment for ventilating the entire hall. As another screening of furnace bay 1 against ladle bay 2, enclosing or shutoff partitions 23 are provided at both sides of the row of bins 4,5 and conveyors 7, extending up to the roof truss. While omitting the encasement of the furnace, furnace bay 1 may completely be separated from ladle bay 2 by a protective wall 24 provided with necessary openings for the means of transportation.

Thus, in accordance with the invention, there is provided an arrangement of an electric smelting furnace with bins and charging equipment being disposed above the furnace and the charging equipment being employed for transporting the charge over conveyors into these bins, removing it from these bins through conveying and metering devices, and feeding it by means of charging tubes into the furnace vessel, characterized in that the electric smelting furnace 3 is provided in the furnace bay 1 at the side close to the ladle bay 2 adjacent to the furnace bay 1 and that the bins 4,5 for the iron stock, fluxing material, and alloying means, with their associated outlet, conveying, and metering devices 8 to 12 are provided sequentially in the longitudinal direction of the bay, in the vertical zone between the crane runways 6 of the furnace bay 1 and of the adjacent ladle bay 2 and that a reversible conveyor 14, extending transversely to the longitudinal direction of the bays, is provided at a lower level and equipped with discharge mechanisms 15,17 at both its ends, followed by charging tubes 16,18 and that anti-emission means are also provided. The alloying means and fluxing substances are supplied from the bins 5 into a metering device 12 which is movable parallel to the conveying device 9 and supplies the means to the reversible conveyor 14. One or more charging tubes 16 for filling the furnace are connected to the discharge mechanism 15 at the furnace side, and one or more charging tubes 18 for the tap and for secondary metallurgical treatment in the ladle 20 are connected to the charge mechanism 17 at the opposite side of the reversible conveyor 14 extending transversely into the furnace bay 1. The electric smelting furnace 3 is enclosed all around by a housing 21, which has a displaceable wall 22 at its side turned to the furnace bay and is provided with apertures for passing therethrough the charging tubes 16,18. Except for openings necessary for means of transportation, the furnace bay 1 is completely separated from the adjacent ladle bay 2 by providing shutoff partitions 23 at both sides of the overhead bins 4,5 and conveyors 7 thereabove, and by a protective wall 24.

While a specific embodiment of the invention has been shown and described in detail to illustrate the application of the principles of the invention, it will be understood that the invention may be embodied otherwise without departing from such principles.

What is claimed is:

1. In an electric smelting furnace arrangement of the type having an electric smelting furnace including a furnace vessel, bins, charging equipment means operable for transporting a charge into the bins, conveying means and metering means for removing the charge from the bins, charging tubes for feeding the charge into the furnace vessel, an elongated furnace bay, an elongated ladle bay longitudinally extending adjacent to the furnace bay and crane runways, one of said crane runways being longitudinally extended over a respective one of each of the furnace bay and ladle bay, the improvement wherein the electric smelting furnace is provided in the furnace bay at a side close to the ladle bay adjacent to the furnace bay, the bins comprising first bins for iron stock and second bins for fluxing material and alloying means, and first outlet means connected to said first bins, second outlet means connected to said second bins, conveyors and metering devices located underneath said first and second outlet means, wherein said first and second bins, said first and second outlet means, said conveyors and said metering devices are sequentially mounted in the longitudinal direction of said furnace and ladle bays in a vertical zone between said crane runways of the furnace bay and the adjacent ladle bay, and a reversible conveyor extending transversely to the longitudinal direction of said furnace and ladle bays at lower level beneath said bins, said outlet means, said first-mentioned conveyors and said metering devices, discharge means at both ends of said reversible conveyor, and charging tubes for receiving discharge from said discharge means.

2. An improved arrangement according to claim 1, further comprising a metering device operatively connected to said second bins, said metering device being movable in parallel to said first-mentioned conveyings, said metering device being operable to supply said reversible conveyor.

3. An improved arrangement according to claim 1 or 2, wherein one or more of said charging tubes are provided for filling the furnace and are connected to said discharge means at the furnace side, and one or more of said charging tubes are provided for the tap and for secondary metallurgical treatment in the ladle and are connected to the discharge means at the opposite side of said reversible conveyor extending transversely into the furnace bay.

4. An improved arrangement according to claim 1, further comprising a housing enclosing the electric smelting furnace, said housing having a displaceable wall at a side turned to the furnace bay, said housing having apertures, and said charging tubes being passed through said apertures.

5. An improved arrangement according to claim 1, wherein except for openings necessary for means of transportation, shutoff partitions are provided for completely separating the furnace bay from the adjacent ladle bay at both sides of the overhead bins and conveyors.

* * * * *